(12) United States Patent
Schiemenz

(10) Patent No.: US 11,308,418 B2
(45) Date of Patent: Apr. 19, 2022

(54) AUTOMATIC SELECTION OF VARIABLES FOR A MACHINE-LEARNING MODEL

(71) Applicant: SAP SE, Walldorf (DE)

(72) Inventor: Torsten Schiemenz, Dielheim (DE)

(73) Assignee: SAP SE, Walldorf (DE)

( * ) Notice: Subject to any disclaimer, the term of this patent is extended or adjusted under 35 U.S.C. 154(b) by 799 days.

(21) Appl. No.: 15/705,323

(22) Filed: Sep. 15, 2017

(65) Prior Publication Data
US 2019/0087744 A1    Mar. 21, 2019

(51) Int. Cl.
*G06N 20/00* (2019.01)

(52) U.S. Cl.
CPC ................... *G06N 20/00* (2019.01)

(58) Field of Classification Search
CPC ...................................... G06N 20/20
See application file for complete search history.

(56) References Cited

U.S. PATENT DOCUMENTS 7,624,074 B2 * 11/2009 Weston ............ G06N 20/00 706/1
8,751,273 B2 * 6/2014 Pinto ............... G06Q 10/063 705/7.11

FOREIGN PATENT DOCUMENTS

WO    WO-2014100738 A1 * 6/2014 ......... H04L 67/1097

OTHER PUBLICATIONS

Chen, "Combining SVMs with Various Feature Selection Strategies", 2006 (Year: 2006).*
Yuan, "A Two-phase Feature Selection Method using both Filter and Wrapper", IEEE, 1988 (Year: 1988).*
Somol, "Evaluating Stability and Comparing Output of Feature Selectors that Optimize Feature Subset Cardinality", 2010 (Year: 2010).*
Lu, "Feature Selection Using Principal Feature Analysis", 2007 (Year: 2007).*
Wagner, "Stepwise selection of variables in data envelopment analysis: Procedures and managerial perspectives", 2007 (Year: 2007).*
Yakov Frayman, "Solving Regression Problems Using Competitive Ensemble Models", 2002 (Year: 2002).*

* cited by examiner

*Primary Examiner* — Ann J Lo
*Assistant Examiner* — Van C Mang
(74) *Attorney, Agent, or Firm* — Erise IP, P.A.

(57) ABSTRACT

Computer-implemented systems and methods for reducing an amount of computational resources consumed by a machine-learning model are provided. A machine-learning model is applied to a dataset to generate a first output. The machine-learning model includes a plurality of variables. Variables are iteratively removed from the machine-learning model, and for each iteration, the machine-learning model is applied with one or more variables removed from the dataset to generate a second output. For each iteration, the first and second outputs are compared. A subset of the removed variables having impact below a predetermined threshold on an output of the machine-learning model is determined based on the comparisons. An optimized machine-learning model that omits the subset of variables is applied to new data to generate an output for the new data.

20 Claims, 7 Drawing Sheets

| Temp. | Headache | Backache | Tearing eyes | Sore throat | Furred tongue | Gender | Runny nose | Result |
|---|---|---|---|---|---|---|---|---|
| 37.2 | x | | x | x | x | m | x | Flu |
| 38.4 | | x | | x | x | f | x | Flu |
| 36.8 | x | x | x | | x | f | x | |
| 36.6 | x | | x | | | f | | |
| 38.3 | x | | | x | x | m | x | Flu |
| 39.2 | x | | | x | x | f | x | Flu |
| 36.7 | x | x | x | | | f | | |
| 38.0 | | x | | | | | | |

FIG. 3A

| Temp. | Headache | Backache | Tearing eyes | Sore throat | Furred tongue | | Runny nose | Result |
|---|---|---|---|---|---|---|---|---|
| 37.2 | x | | x | x | x | | x | Flu |
| 38.4 | | x | | x | x | | x | Flu |
| 36.8 | x | x | x | | x | | | |
| 36.6 | x | | x | | | | | |
| 38.3 | x | | | x | x | | x | Flu |
| 39.2 | x | | | x | x | | x | Flu |
| 36.7 | x | x | x | | | | | |
| 38.0 | | x | | | | | | |

FIG. 3B

| Temp. | Headache | Backache | Tearing eyes | | Furred tongue | | Runny nose | Result |
|---|---|---|---|---|---|---|---|---|
| 37.2 | x | | x | | x | | x | |
| 38.4 | | x | | | x | | x | |
| 36.8 | x | x | x | | x | | | Flu |
| 36.6 | x | x | x | | | | | Flu |
| 38.3 | x | | | | x | | x | |
| 39.2 | x | | | | x | | x | |
| 36.7 | x | x | x | | x | | | Flu |
| 38.0 | | x | | | | | | |

FIG. 3C

AUTOMATIC SELECTION OF VARIABLES FOR A MACHINE-LEARNING MODEL

FIELD

The present description relates to computer-based techniques for automatically reducing an amount of computational resources consumed by a machine-learning model.

BACKGROUND

The term "big data" generally refers to the use of very large datasets and predictive analytics to extract values from such datasets. For instance, predictive analytics may be used to determine correlations, trends, patterns, and categories from the datasets. Such analyses often rely on machine learning, which typically involves building a machine-learning model from a sample dataset (often referred to as a "training dataset") and then applying the machine-learning model to new data to make predictions, decisions, or classifications.

SUMMARY

Computer-implemented systems and methods are provided for automatically reducing an amount of computational resources consumed by a machine-learning model. In an example computer-implemented method for reducing an amount of computational resources consumed by a machine-learning model, a machine-learning model is applied to a dataset with a processing system to generate a first output. The machine-learning model includes a plurality of variables. Variables are iteratively removed from the machine-learning model, and for each iteration, the machine-learning model is applied with one or more variables removed from the dataset to generate a second output. For each iteration, the first and second outputs are compared. A subset of the removed variables having impact below a predetermined threshold on an output of the machine-learning model is determined based on the comparisons. An optimized machine-learning model that omits the subset of variables is applied to new data with the processing system to generate an output for the new data.

An example computer-implemented system for reducing an amount of computational resources consumed by a machine-learning model includes a processing system and computer-readable memory in communication with the processing system encoded with instructions for commanding the processing system to execute steps. In executing the steps, a machine-learning model is applied to a dataset to generate a first output. The machine-learning model includes a plurality of variables. Variables are iteratively removed from the machine-learning model, and for each iteration, the machine-learning model is applied with one or more variables removed from the dataset to generate a second output. For each iteration, the first and second outputs are compared. A subset of the removed variables having impact below a predetermined threshold on an output of the machine-learning model is determined based on the comparisons. An optimized machine-learning model that omits the subset of variables is applied to new data to generate an output for the new data.

An example non-transitory computer-readable storage medium for reducing an amount of computational resources consumed by a machine-learning model comprises computer executable instructions which, when executed, cause a processing system to execute steps. In executing the steps, a machine-learning model is applied to a dataset to generate a first output. The machine-learning model includes a plurality of variables. Variables are iteratively removed from the machine-learning model, and for each iteration, the machine-learning model is applied with one or more variables removed from the dataset to generate a second output. For each iteration, the first and second outputs are compared. A subset of the removed variables having impact below a predetermined threshold on an output of the machine-learning model is determined based on the comparisons. An optimized machine-learning model that omits the subset of variables is applied to new data to generate an output for the new data.

The subject matter described herein provides many technical advantages. As described below, the computer-based techniques of the present disclosure improve the functioning of a computer system as compared to conventional approaches because the techniques described herein enable predictive analyses of data to be performed in a manner that is more efficient than the conventional approaches. The computer-based techniques achieve such improvements through the use of systems and methods that automatically select variables to be included in a machine-learning model. The variables are selected in a manner that minimizes the number of variables needed to provide a desired level of prediction accuracy. By minimizing the number of variables, the machine-learning model can operate on smaller amounts of data as compared to models of the conventional approaches. This improves the performance of one or more computer systems by enabling predictive analyses to be performed more efficiently (e.g., in a manner that is faster, with smaller memory requirements and reduced processing burden, etc.) as compared to the conventional approaches. These technical advantages and others are described in detail below.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 3A, 3B, and 3C depict an example application of the systems and methods described herein to a dataset, in accordance with some embodiments of the present disclosure.

DETAILED DESCRIPTION

Figure 1:
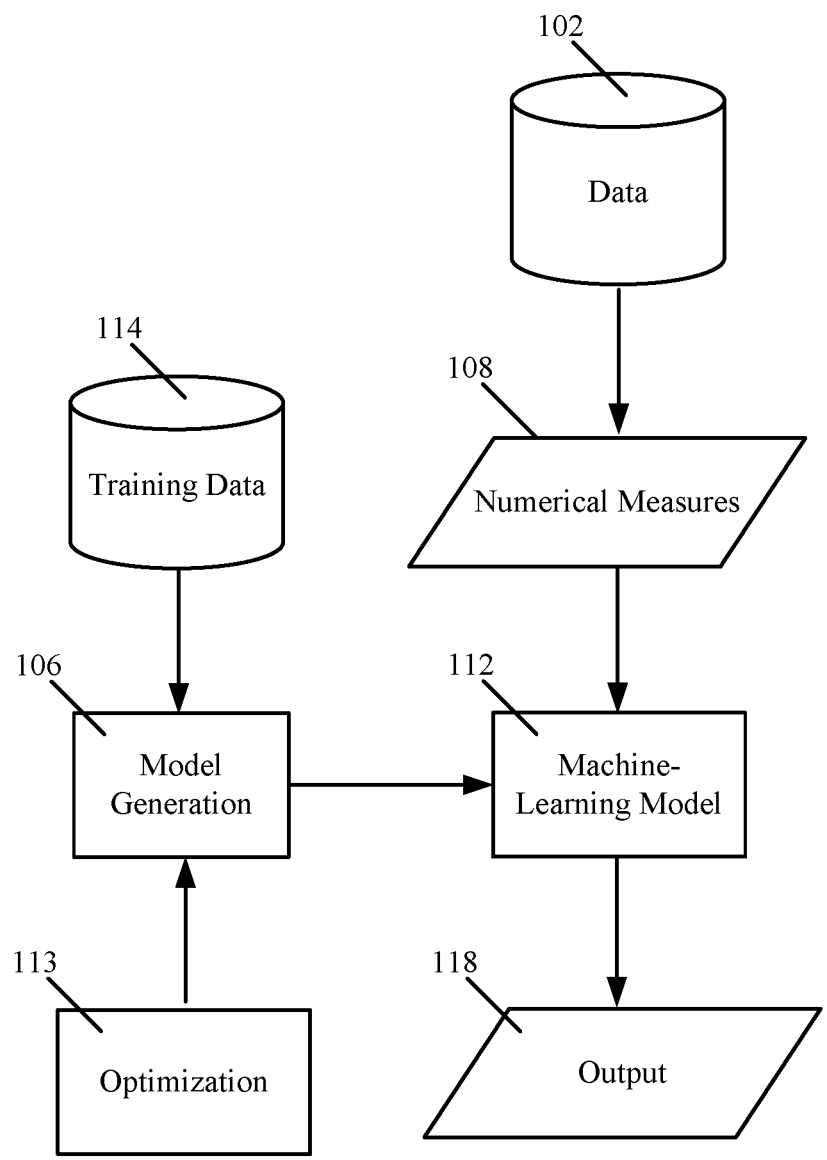
FIG. 1 is a block diagram illustrating an example system for automatically determining a set of variables to be used in a machine-learning model, in accordance with embodiments of the present disclosure.

Performing predictive analyses on very large datasets (e.g., "big data") often requires use of a machine-learning model having a number of variables (also referred to as "parameters"). Conventionally, variables of the machine-learning model are chosen manually by a human user. The human user may choose the variables based on his or her experience, knowledge and also based on any patterns that the human can manually detect in the data. For instance, a medical professional may manually select variables of a machine-learning model used to predict whether a patient has the flu. Based on the medical professional's experience with previous patients, she may determine that if a patient has a high temperature and a sore throat, then the patient is likely to have the flu. Accordingly, the medical professional may select "high temperature" and "sore throat" variables to be included in the machine-learning model because she believes these variables to be predictive of whether a patient has the flu. Further, if the medical professional has access to a dataset of patient data, she may manually inspect the data and identify additional variables that appear to be predictive of whether a patient has the flu.

However, as the sizes of datasets grow, it becomes increasingly difficult to manually select variables for a machine-learning model. In the modern era of "big data," datasets may include tens or hundreds of columns, each representing a variable or parameter. Such datasets may also include many thousands or millions of rows, each representing a separate record. It is difficult for a human user to work with a dataset of this size and manually select variables (e.g., columns of the dataset) for the machine-learning model.

In some of the conventional approaches, a relatively large number of variables (e.g., variables corresponding to all columns of a dataset) are selected for the machine-learning model. Thus, for instance, rather than requiring the human user to manually choose variables for the model, all (or most) of the available variables are selected for inclusion. Selecting variables in this manner may provide relatively high prediction accuracy, but using the resulting model is computationally expensive. Specifically, when a large number of variables are used, the data to be analyzed must have a relatively large size in order to include all of the necessary columns of data. Analyzing such data requires a relatively large amount of memory, processing capacity, and/or network bandwidth. Further, using a machine-learning model with the relatively large number of variables may not provide the highest prediction accuracy. This is because some of the variables may not be predictive and thus may lower the prediction accuracy of the model.

To overcome one or more of the deficiencies of the conventional approaches, the present disclosure describes systems and methods for selecting variables to be included in a machine-learning model. The variables are selected automatically and in a manner, that requires no human intervention or minimal human intervention. To achieve this, a machine-learning optimization routine is utilized. In embodiments, the routine starts with all variables in question and performs steps to reduce the variables to the minimum number needed to provide a desired level of prediction accuracy. In doing so, the machine-learning optimization routine may take into account the variation of the variables. For instance, in a predictive analysis, a variable with a high level of variation is generally not predictive of an output value, and such a variable may be omitted from the machine-learning model, as described below. To reduce the variables to the minimum number needed, the machine-learning optimization routine performs multiple iterations (e.g., multiple loops) until a minimum set of variables is found that provides a maximum prediction precision.

With the minimized set of variables, the machine-learning model can operate on smaller amounts of data as compared to the conventional approaches. This improves the performance of one or more computer systems by enabling predictive analyses to be performed more efficiently (e.g., faster, with smaller memory requirements, reduced processing burden, etc.) than the conventional approaches.

FIG. 1 is a block diagram illustrating an example system for automatically determining a set of variables to be used in a machine-learning model 112, in accordance with embodiments of the present disclosure. The machine-learning model 112 is used to perform predictive analyses on data 102. For instance, the data 102 may include medical data for a patient, and the machine-learning model 112 may be applied to the medical data to predict whether the patient has a certain medical condition (e.g., cancer, the flu, etc.). In the example of FIG. 1, the prediction, decision, or classification generated by the machine-learning model 112 is illustrated as output 118. Although embodiments described herein relate to a machine-learning model for predicting whether a patient has a medical condition, the present disclosure is not limited to this context. Rather, the systems and methods described herein can be used to automatically select variables for various machine-learning models, with such models being usable to generate predictions, decisions, classifications, and/or other outputs in a variety of different contexts.

In embodiments, numerical measures 108 are extracted from the data 102, and the machine-learning model 112 is applied to the numerical measures 108 to generate the output 118. The numerical measures 108 include numbers (e.g., Boolean values, percentages, decimal numbers, integer numbers, etc.) that are representative of aspects of the data 102. For instance, in the aforementioned example where the data 102 includes medical data for the patient, the numerical measures 108 may include numbers representative of (i) the patient's temperature, (ii) whether the patient is experiencing a headache, backache, tearing eyes, sore throat, and other conditions, and (iii) the patient's gender, among other numbers.

The numerical measures 108 extracted from the data 102 are received at the machine-learning model 112. The machine-learning model 112 is applied to the numerical measures 108 to generate the output 118 that is a prediction, decision, classification, or other output associated with the data 102. The output 118 may be a Boolean value (e.g., a "1" if the patient has the medical condition or a "0" if the patient does not), a probability (e.g., a probability indicative of whether the patient has the medical condition), a classification (e.g., "high," "medium," "low," etc.), or another output in a numerical or textual form. In embodiments, the machine-learning model 112 generates the output 118 in a manner that requires no human intervention or minimal human intervention. The machine-learning model 112 may be referred to as an "equation," "numerical computer model," or "algorithm."

The machine-learning model 112 includes a plurality of variables and associated weighting factors, with the weighting factors being determined based on training data 114. For instance, in an example in which three numerical measures are extracted from the data 102, the machine-learning model 112 includes a first variable and an associated first weighting factor, a second variable and an associated second weighting factor, and a third variable and an associated third weighting factor. The first variable receives a value of the first numerical measure, the second variable receives a value of the second numerical measure, and the third variable receives a value of the third numerical measure. By applying the machine-learning model 112 to the first, second, and third numerical measures in this manner, the prediction, decision, classification, or other output represented by the output 118 is generated.

Figure 4:
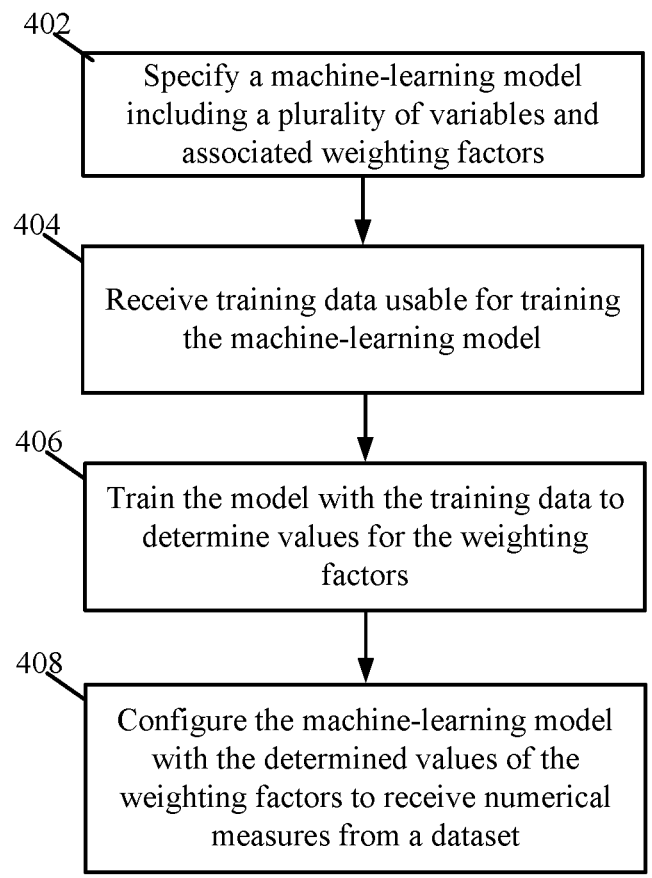
FIG. 4 is a flowchart depicting operations of an example method for constructing a machine-learning model, in accordance with some embodiments of the present disclosure.

To generate the machine-learning model 112, a model generation algorithm 106 may be used. The model generation algorithm 106 processes the training data 114 to determine the weighting factors for the machine-learning model 112 (e.g., through a regression analysis, etc.). The training data 114 includes data that has been accepted as usable for training the machine-learning model 112. In an example, the weighting factors of the machine-learning model 112 are determined via a machine-learning application trained based on the training data 114. Specifically, the machine-learning application may employ a logistic regression analysis or another suitable machine-learning algorithm. Generation of the machine-learning model 112 based on the training data 114 is described in further detail below with reference to FIG. 4.

In embodiments, the machine-learning model 112 generated by the model generation algorithm 106 may include a relatively large number of variables. For instance, if the training data 114 includes a relatively large number of columns, the machine-learning model 112 may have a variable for each of the columns. This is disadvantageous for several reasons. First, when a large number of variables are used, the data to be analyzed must be relatively large in size, and the analysis of such data may require significant computing resources. Second, some of the variables may not be predictive, and this lowers the prediction accuracy of the machine-learning model 112. In conventional approaches, a human user may manually select a subset of the variables, thus lowering the number of variables used in the machine-learning model 112. As explained above, however, it is difficult for a human user to manually select variables, especially as the sizes of datasets grow.

Under the approaches of the present disclosure, a computer-implemented optimization algorithm 113 is executed to select the variables to be included in the machine-learning model 112. The optimization algorithm 113 selects the variables automatically and in a manner, that requires no human intervention or minimal human intervention. Further, the optimization algorithm 113 selects the variables in a manner that minimizes the number of variables necessary to provide a desired level of prediction accuracy. By minimizing the number of variables, the machine-learning model 112 can operate on smaller amounts of data as compared to the conventional approaches, thus enabling predictive analyses to be performed more efficiently. The machine-learning model 112 having the reduced set of variables may be referred to as an "optimized machine-learning model." The optimized machine-learning model may be applied to new data to generate outputs for the new data (e.g., predictions, decisions, and/or classifications associated with the new data).

Figure 2:
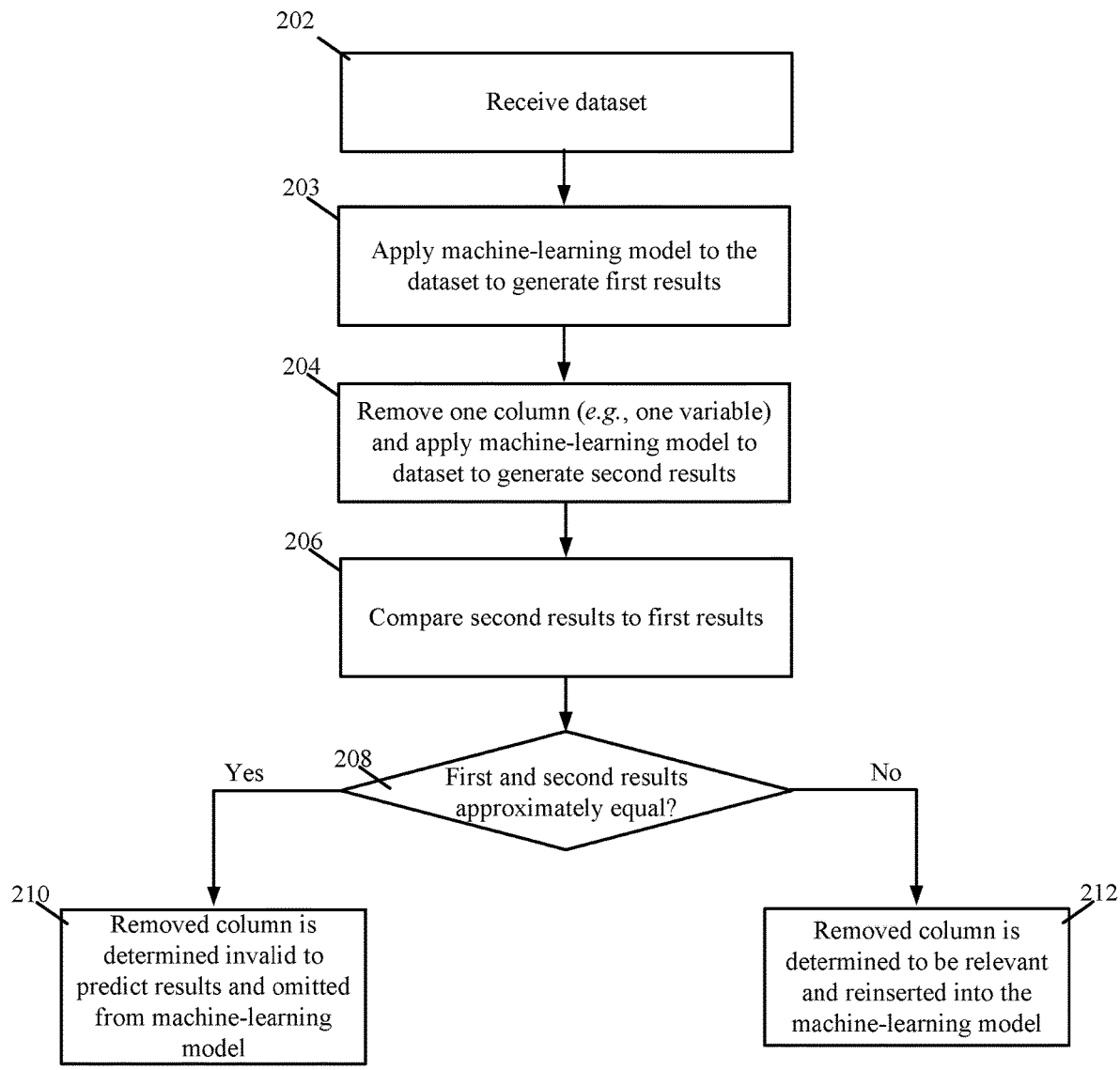
FIG. 2 is a flowchart depicting steps of an example method for automatically determining a set of variables to be used in a machine-learning model, in accordance with embodiments of the present disclosure.

To illustrate aspects of the optimization algorithm 113, reference is made to FIG. 2. This figure is a flowchart depicting steps of an example method for automatically determining a set of variables to be used in a machine-learning model, in accordance with embodiments of the present disclosure. Prior to executing the optimization algorithm of FIG. 2, the machine-learning model must already be trained (e.g., as described above with reference to FIG. 1) and able to process new data. At operation 202, a dataset including a plurality of columns and a plurality of rows is received. Each of the columns represents a variable of the machine-learning model, and each of the rows represents a particular record.

To illustrate an example dataset that may be received at the step 202, reference is made to FIG. 3A. This figure depicts a dataset including columns representative of the variables "temperature," "headache," "backache," "tearing eyes," "sore throat," "furred tongue," "gender," and "runny nose." The "temperature" column is configured to store a decimal number representative of a patient's temperature, the "gender" column is configured to store a value representative of the patient's gender, and the other columns are configured to store Boolean values representative of whether the patient is experiencing a certain condition (e.g., a headache, etc.). Each of the columns represents a variable of the machine-learning model, and each row represents a record associated with a patient. For example, the first row shown in the figure represents a record indicating that a male patient has a temperature of 37.2 degrees Celsius and is experiencing headache, tearing eyes, sore throat, furred tongue, and runny nose conditions.

With reference again to FIG. 2, at step 203, the machine-learning model is applied to the received dataset to generate first results (e.g., a first output). In the example of FIG. 3A, applying the machine-learning model to the dataset generates a first output indicating that the patients represented by the first, second, fifth, and sixth rows have the flu. Based on this output of the machine-learning model, it can be seen that the following variables are relevant in predicting whether a patient has the flu: temperature, headache, sore throat, furred tongue, and runny nose. Specifically, if the patient has a temperature above 37.0 degrees Celsius and is also experiencing headache, sore throat, furred tongue, and runny nose conditions, the machine-learning model will predict that the patient has the flu.

At step 204 in FIG. 2, one variable (e.g., one column) is removed from the machine-learning model, and the machine-learning model is then reapplied to the dataset to generate second results (e.g., a second output). To illustrate an example of this step, reference is made to FIG. 3B. As shown in this figure, the "gender" variable has been removed from the dataset. In applying the machine-learning model with the "gender" variable removed, the model generates a second output indicating that the patients represented by the first, second, fifth, and sixth rows have the flu.

With reference again to FIG. 2, at step 206, the first results are compared to the second results, and at step 208, a determination is made as to whether the first and second results are approximately equal. In embodiments, a predetermined threshold value is used in determining whether the first and second results are approximately equal. For instance, in an example, a difference between the first output and the second output is determined at the step 206. As referred to herein, a "difference" may be a mathematical difference (i.e., determined by subtracting the second output from the first output) or another measure indicative of how the second output differs from the first output. At the step 208, the first and second results are determined to be approximately equal if the difference is less than the predetermined threshold. Conversely, if the difference is not less than the predetermined threshold, then the first and second results are determined to be not approximately equal.

If the second results are determined to be approximately equal to the first results, then at step 210, the variable removed from the machine-learning model in step 204 is determined to be invalid for predicting results and is therefore omitted in subsequent applications of the machine-learning model. In the example of FIGS. 3A and 3B, the second output seen in FIG. 3B is the same as the first output seen in FIG. 3A (i.e., both the first and second outputs indicate that the patients represented by the first, second, fifth, and sixth rows have the flu). This indicates that the "gender" column is not relevant in predicting whether a patient has the flu and that this variable can therefore be omitted in subsequent applications of the machine-learning model.

By contrast, if it is determined at the step 208 of FIG. 2 that the second results are not approximately equal to the first results, then at step 212, the removed variable is determined to be relevant in predicting results and is therefore reinserted into the machine-learning model. To illustrate an example of this step, reference is made to FIG. 3C. As shown in this figure, the "sore throat" variable has been removed from the dataset. In applying the machine-learning model with the "sore throat" variable removed, the model generates a third output indicating that the patients represented by the third, fourth, and seventh rows have the flu (e.g., patients that have a temperature below 37.0 degrees Celsius and are experiencing headache, backache, tearing eyes, and furred tongue conditions). The third output of FIG. 3C differs significantly from the first and second outputs of FIGS. 3A and 3B, respectively. This indicates that the "sore throat" variable is relevant in predicting whether a patient has the flu and that this variable should be reinserted in subsequent applications of the machine-learning model.

In embodiments, the optimization algorithm for selecting variables of the machine-learning model (as described above with reference to FIGS. 2, 3A, 3B, and 3C) is executed in an automated manner that requires no human intervention or minimal human intervention. Specifically, in an example, the optimization algorithm of FIG. 2 is executed multiple times by a computer system in an iterative manner, where one variable (e.g., one column) of the model is removed each time that the algorithm is executed. For each execution of the algorithm, predictive analyses are performed with the machine-learning model having the removed variable, and the results are compared to the initial results obtained when all variables are considered. Thus, although the example of FIG. 2 shows a single iteration of the algorithm in which a single variable is removed from the machine-learning model, it is noted that in embodiments, the steps 204, 206, and 208 are repeated multiple times to analyze each variable and determine whether the variable should be omitted from the machine-learning model.

For example, after performing the first iteration of the steps 204, 206, and 208 described above, a second variable is removed from the machine-learning model, and the machine-learning model is then reapplied to the dataset to generate third results (e.g., a third output). An example removal of the second variable is described above with reference to FIG. 3C, where the "sore throat" variable is removed following the removal of the "gender" variable in FIG. 3B. The first results are compared to the third results, and a determination is made as to whether the first and third results are approximately equal. As described above, this determination may be made by computing a difference between the results. If the difference is less than the predetermined threshold, then the third results are determined to be approximately equal to the first results, and the second variable (i.e., "sore throat" in the example of FIG. 3C) can be omitted in subsequent applications of the machine-learning model. By contrast, if the difference is greater than or equal to the predetermined threshold, then the third results are determined to not be approximately equal to the first results, and the second variable is reinserted into the machine-learning model.

By performing multiple iterations of the optimization algorithm, where one variable is removed each iteration and a determination is made as to whether the variable can be omitted from the model, a minimum set of variables needed to provide a desired level of prediction accuracy can be determined. In embodiments, for each execution of the algorithm, the output is compared to the initial output obtained when all variables (e.g., all columns) are considered. In performing the multiple iterations of the algorithm, a minimum set of variables that causes the output to differ from the initial output by less than a predetermined threshold can be determined. The optimized machine-learning model having the minimum set of variables can then be applied to new data to generate predictions, decisions, classifications, and/or other outputs associated with the new data.

In the embodiments described above, one variable is removed in each iteration of the optimization algorithm. Accordingly, if a number of potential variables is equal to n, the algorithm is executed n times to determine the validity of each of the n variables. In other embodiments, however, the optimization algorithm is executed for each possible combination of variables. For each execution of the algorithm, the output is compared to the initial output obtained when all variables are considered. By considering all possible combinations of variables, a minimum set of variables that causes the output to differ from the initial output by less than a predetermined threshold can be determined.

In embodiments, the threshold used in removing variables from the machine-learning model is based on statistical information (e.g., result-variance, etc.). It is further noted that over time, a variable removed from the machine-learning model may become relevant again. Therefore, in embodiments, the optimization algorithm for determining the variables to be included in the machine-learning model is executed on a regular basis to ensure that the most significant parameters for the prediction are included. When the optimization algorithm is executed again after a period of time, all possible variables are reconsidered, and the algorithm selects the minimum set of variables, as described above. In some embodiments, a randomized selection of data from a dataset may be used to decrease the amount of time needed to run the optimization algorithm. For instance, rather than executing the optimization algorithm on an entire dataset, the algorithm may instead be applied to a smaller amount of data randomly selected from the dataset (e.g., 10% of the data). Through the randomization and the repetition of the algorithm, it is ensured that all data of the dataset is taken into consideration over time.

As explained above, in embodiments, the machine-learning model is generated based on training data. In FIG. 1, for instance, the model generation algorithm 106 receives the training data 114 and uses it to determine weighting factors of the machine-learning model 112. To provide further details on the building of such a machine-learning model, reference is made to FIG. 4. This figure is a flowchart depicting operations of an example method for constructing a machine-learning model, in accordance with some embodiments of the present disclosure.

At step 402, a machine-learning model associated with a dataset is specified. The machine-learning model includes a plurality of variables and associated weighting factors, where each of the variables corresponds to a column of data of the dataset. For instance, in the example of FIG. 3A, a machine-learning model may include variables corresponding to the "temperature," "headache," "backache," "tearing eyes," "sore throat," "furred tongue," "gender," and "runny nose" columns of the dataset.

At step 404, training data determined to be usable for training the machine-learning model is received. In embodiments, the training data includes a dataset of records, where each record has been assigned an output value. For instance, in building the machine-learning model for FIGS. 3A, 3B, and 3C, the training data may include records of patient data, with each record indicating whether the patient has the flu or not. In this example, the flu condition is the output value to be predicted by the machine-learning model.

At step 406, the machine-learning model is trained with a processing system using the training data to determine values for the weighting factors. In embodiments, the training of the machine-learning model may include processing the training data to extract from each record numerical measures corresponding to the variables of the model. The training of the scoring model may further include conducting a machine-learning analysis (e.g., a numerical regression analysis, etc.) based on the extracted numerical measures to determine the weighting factors.

At step 408, the machine-learning model is configured with the determined values of the weighting factors. The machine-learning model is then ready to be used for processing new data, i.e., to receive numerical measures corresponding to the variables of the model so as to generate a prediction or decision for the new data.

Figure 5:
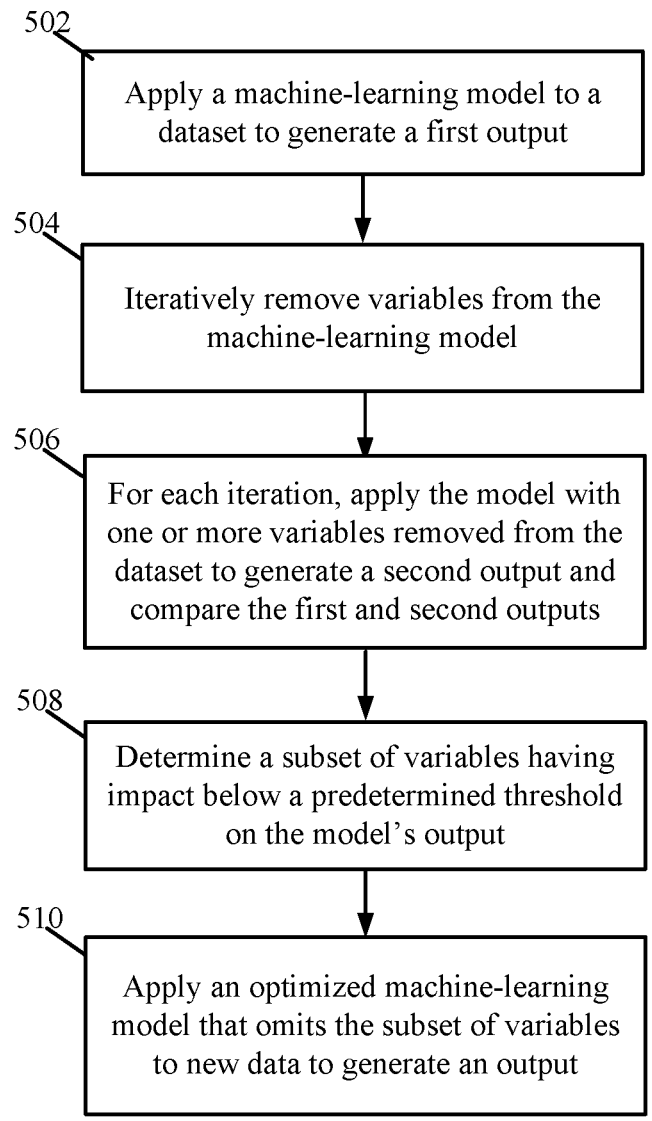
FIG. 5 is a flowchart depicting steps of an example method for reducing an amount of computational resources consumed by a machine-learning model, in accordance with embodiments of the present disclosure.

FIG. 5 is a flowchart depicting steps of an example method for reducing an amount of computational resources consumed by a machine-learning model, in accordance with embodiments of the present disclosure. At step 502, a machine-learning model is applied to a dataset with a processing system to generate a first output. The machine-learning model includes a plurality of variables. At step 504, variables are iteratively removed from the machine-learning model. At step 506, for each iteration, the machine-learning model is applied with one or more variables removed from the dataset to generate a second output. Further, at the step 506, for each iteration, the first and second outputs are compared. At step 508, a subset of the removed variables having impact below a predetermined threshold on an output of the machine-learning model is determined based on the comparisons. At step 510, an optimized machine-learning model that omits the subset of variables is applied to new data to generate an output for the new data.

Figure 6A:
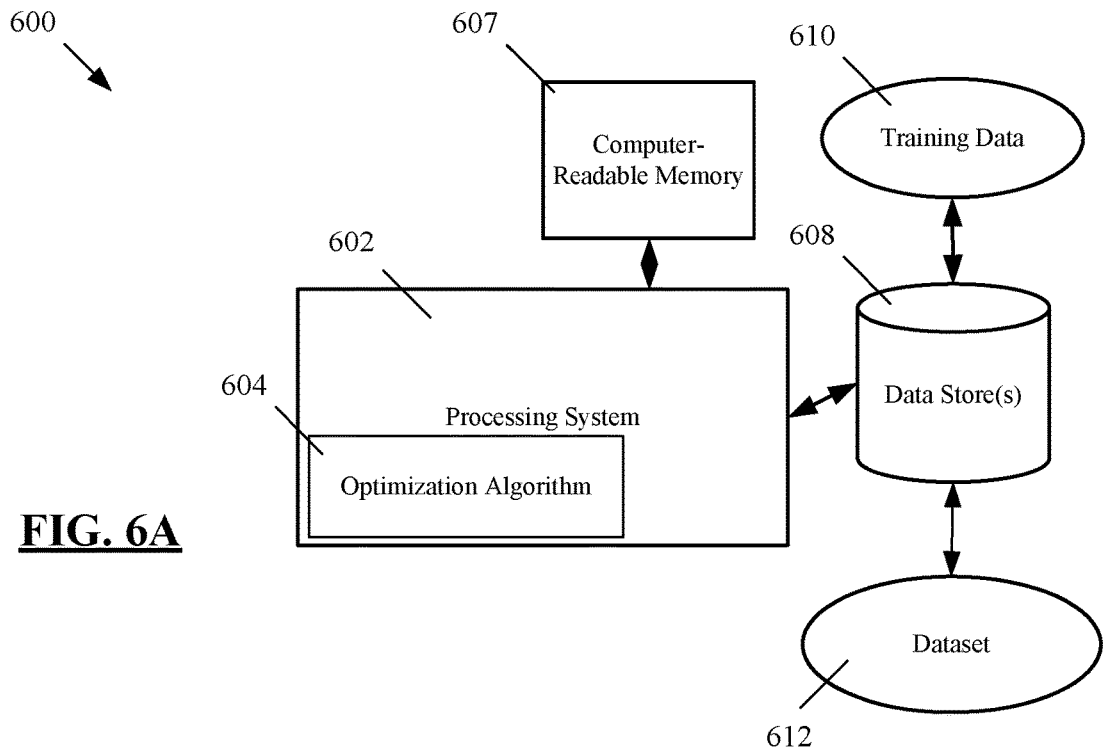
FIGS. 6A, 6B, and 6C depict example systems for implementing the techniques described herein.
Figure 6B:
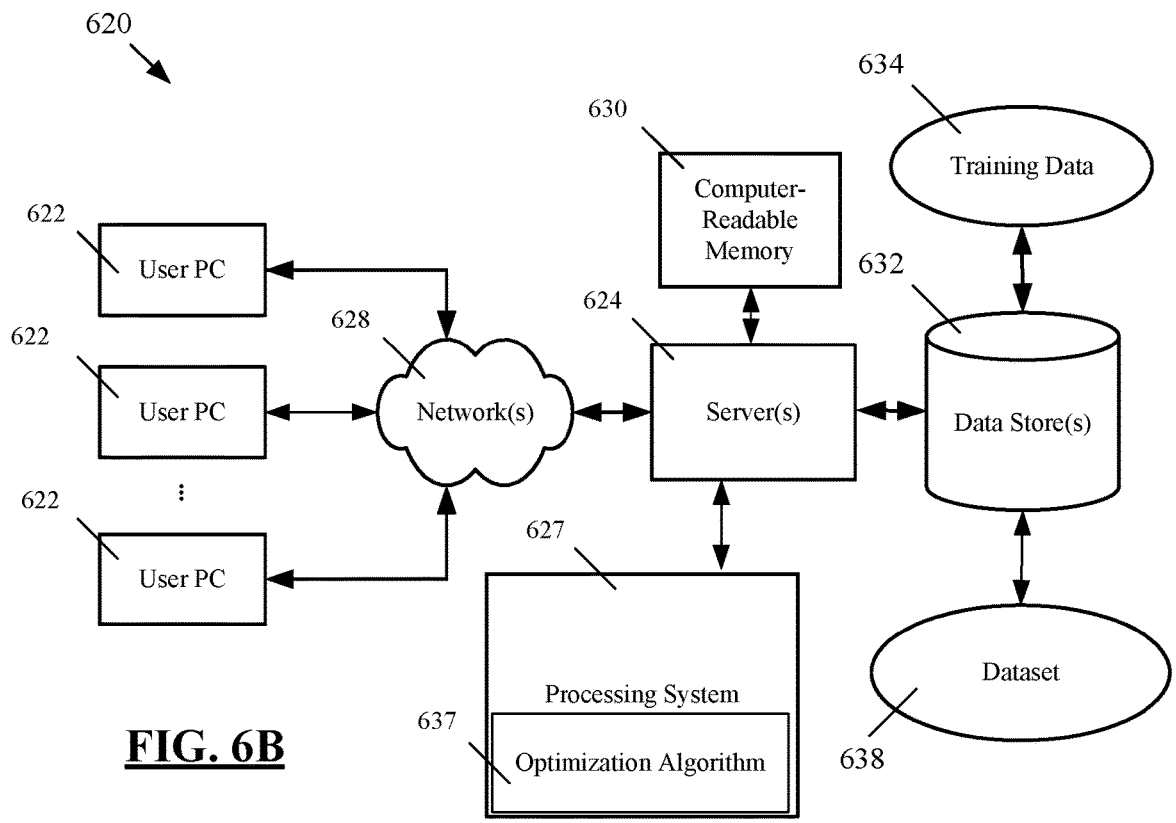
Figure 6C:
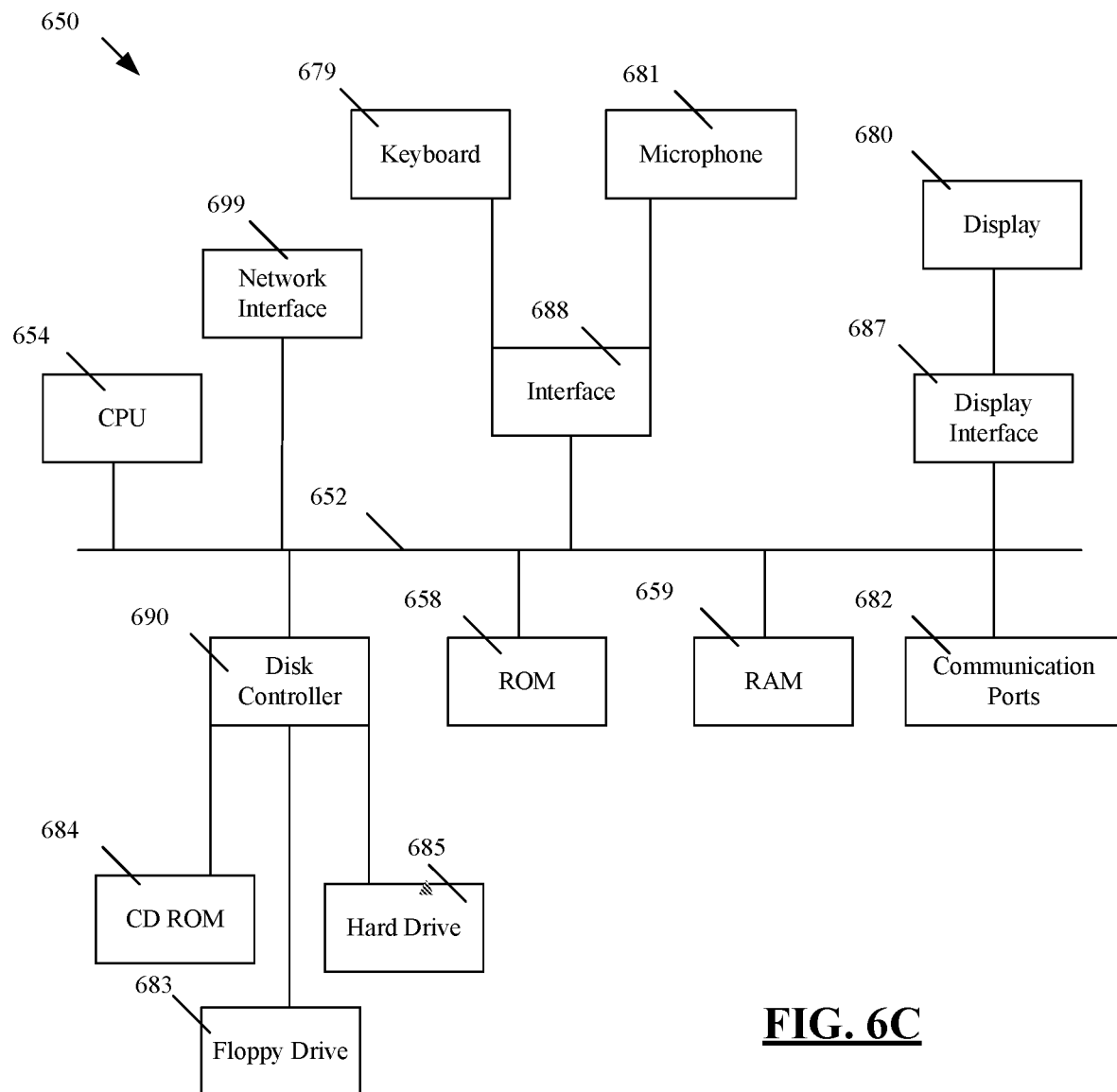

FIGS. 6A, 6B, and 6C depict example systems for implementing the techniques described herein for automatically determining a set of variables to be used in a machine-learning model. For example, FIG. 6A depicts an exemplary system 600 that includes a standalone computer architecture where a processing system 602 (e.g., one or more computer processors located in a given computer or in multiple computers that may be separate and distinct from one another) executes an optimization algorithm 604 (e.g., optimization algorithm 113 of FIG. 1, etc.). The processing system 602 has access to a computer-readable memory 607 in addition to one or more data stores 608. The one or more data stores 608 may include training data 610 as well as one or more datasets 612. The processing system 602 may be a distributed parallel computing environment, which may be used to handle very large-scale data sets.

FIG. 6B depicts a system 620 that includes a client-server architecture. One or more user PCs 622 access one or more servers 624 executing an optimization algorithm 637 on a processing system 627 via one or more networks 628. The one or more servers 624 may access a computer-readable memory 630 as well as one or more data stores 632. The one or more data stores 632 may include training data 634 as well as one or more datasets 638.

FIG. 6C shows a block diagram of exemplary hardware for a standalone computer architecture 650, such as the architecture depicted in FIG. 6A that may be used to include and/or implement the program instructions of system embodiments of the present disclosure. A bus 652 may serve as the information highway interconnecting the other illustrated components of the hardware. A processing system 654 labeled CPU (central processing unit) (e.g., one or more computer processors at a given computer or at multiple computers), may perform calculations and logic operations required to execute a program. A non-transitory processor-readable storage medium, such as read only memory (ROM) 658 and random access memory (RAM) 659, may be in communication with the processing system 654 and may include one or more programming instructions for performing methods (e.g., algorithms) for automatically determining a set of variables to be used in a machine-learning model. Optionally, program instructions may be stored on a non-transitory computer-readable storage medium such as a magnetic disk, optical disk, recordable memory device, flash memory, or other physical storage medium.

In FIGS. 6A, 6B, and 6C, computer readable memories 607, 630, 658, 659 or data stores 608, 632, 683, 684 may include one or more data structures for storing and associating various data used in the example systems for automatically determining a set of variables to be used in a machine-learning model. For example, a data structure stored in any of the aforementioned locations may be used to store data relating to training data and/or live datasets used by a computer application. A disk controller 690 interfaces one or more optional disk drives to the system bus 652. These disk drives may be external or internal floppy disk drives such as 683, external or internal CD-ROM, CD-R, CD-RW or DVD drives such as 684, or external or internal hard drives 685. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 690, the ROM 658 and/or the RAM 659. The processor 654 may access one or more components as required.

A display interface 687 may permit information from the bus 652 to be displayed on a display 680 in audio, graphic, or alphanumeric format. Communication with external devices may optionally occur using various communication ports 682.

In addition to these computer-type components, the hardware may also include data input devices, such as a keyboard 679, or other input device 681, such as a microphone, remote control, pointer, mouse and/or joystick. Such data input devices communicate with the standalone computer architecture 650 via an interface 688, in some embodiments. The standalone computer architecture 650 further includes a network interface 699 that enables the architecture 650 to connect to a network, such as a network of the one or more networks 628.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method of reducing an amount of computational resources consumed by a machine-learning model, the method comprising:
  applying, by at least one data processor of a computing device, a machine-learning model to a first dataset to generate a first output, the first dataset comprising a randomized selection of variables,
  wherein the machine-learning model is trained prior to the applying;
  iteratively removing, by at least one data processor, variables of the randomized selection of variables from the first dataset resulting in a subset of data;
  for each iteration, (i) applying, by at least one data processor, the machine-learning model to the subset of data, wherein the subset of data has one or more variables removed from the first dataset to generate a second output, and (ii) comparing the first and second outputs by determining whether a difference of the first and second outputs is less than a predetermined threshold value, resulting in iterative comparisons;

determining, by at least one data processor, a minimum set of variables that excludes variables having an impact below a predetermined threshold on the output of the machine-learning model based on the iterative comparisons, wherein applying the machine-learning model to the first dataset comprising only the minimum set of variables generates an output equal to the first output, wherein each of the output and the first output comprise at least one of a prediction, a decision, or a classification;

applying, by at least one data processor, subsequent to the determining, the machine- learning model to new data to generate an output for the new data, wherein the new data includes the minimum set of variables; and periodically determining a new minimum set of variables based on repeated iterative comparisons with a subsequent randomized selection of variables.

2. The computer-implemented method of claim 1, wherein the output for the new data comprises a prediction, decision, or classification associated with the new data.

3. The computer-implemented method of claim 1, wherein the subset of variables is determined based at least in part on the difference of the first and second outputs.

4. The computer-implemented method of claim 3, further comprising:

determining, by at least one data processor, whether the difference is less than the predetermined threshold, wherein a variable is determined to have impact below the predetermined threshold based on a determination that the difference is less than the predetermined threshold.

5. The computer-implemented method of claim 1, wherein the machine-learning model includes weighting factors associated with the randomized selection of variables, the method further comprising:

receiving, by at least one data processor, training data determined to be usable for training the machine-learning model, training, by at least one data processor, the machine-learning model using the training data to determine values for the weighting factors; and configuring, by at least one data processor, the machine-learning model with the determined values of the weighting factors.

6. The computer-implemented method of claim 5, wherein the training comprises:

processing, by at least one data processor, the training data to determine numerical measures from the training data for the randomized selection of variables; and conducting, by at least one data processor, a numerical machine-learning analysis based on the numerical measures from the training data to determine the values of the weighting factors.

7. A computer-implemented system for reducing an amount of computational resources consumed by a machine-learning model, the system comprising:

a processing system; and computer-readable memory in communication with the processing system encoded with instructions for commanding the processing system to execute steps comprising:

applying a machine-learning model to a first dataset to generate a first output, the first dataset comprising a randomized selection of variables, wherein the machine-learning model is trained prior to the applying;

iteratively removing variables of the plurality randomized selection of variables from the first dataset resulting in a subset of data;

for each iteration, (i) applying the machine-learning model to the subset of data, wherein the subset of data has one or more variables removed from the first dataset to generate a second output, and (ii) comparing the first and second outputs by determining whether a difference of the first and second outputs is less than a predetermined threshold value, resulting in iterative comparisons;

determining a minimum set of variables that excludes variables having an impact below a predetermined threshold on the output of the machine-learning model based on the iterative comparisons, wherein applying the machine-learning model to the first dataset comprising only the minimum set of variables generates an output equal to the first output, wherein each of the output and the first output comprise at least one of a prediction, a decision, or a classification;

applying, subsequent to the determining, the machine-learning model to new data to generate an output for the new data, wherein the new data includes the minimum set of variables; and periodically determining a new minimum set of variables based on repeated iterative comparisons with a subsequent randomized selection of variables.

8. The computer-implemented system of claim 7, wherein the output for the new data comprises a prediction, decision, or classification associated with the new data.

9. The computer-implemented system of claim 7, wherein the subset of variables is determined based at least in part on the difference of the first and second outputs.

10. The computer-implemented system of claim 9, wherein the steps include:

determining whether the difference is less than the predetermined threshold, wherein a variable is determined to have impact below the predetermined threshold based on a determination that the difference is less than the predetermined threshold.

11. The computer-implemented system of claim 7, wherein the machine-learning model includes weighting factors associated with the randomized selection of variables, and the steps further include:

receiving training data determined to be usable for training the machine-learning model;

training the machine-learning model with the processing system using the training data to determine values for the weighting factors; and configuring the machine-learning model with the determined values of the weighting factors.

12. The computer-implemented system of claim 11, wherein the training comprises:

processing the training data to determine numerical measures from the training data for the randomized selection of variables; and conducting a numerical machine-learning analysis based on the numerical measures from the training data to determine the values of the weighting factors.

13. A non-transitory computer-readable storage medium for reducing an amount of computational resources consumed by a machine-learning model, the computer-readable storage medium comprising computer executable instructions which, when executed, cause a processing system to execute steps including:
    applying a machine-learning model to a first dataset comprising medical data to generate a first output, the first dataset comprising a randomized selection of variables,
    wherein the machine-learning model is trained prior to the applying;
    iteratively removing variables of the randomized selection of variables from the first dataset resulting in a subset of data;
    for each iteration, (i) applying the machine-learning model to the subset of data, wherein the subset of data has one or more variables removed from the first dataset to generate a second output, and (ii) comparing the first and second outputs by determining whether a difference of the first and second outputs is less than a predetermined threshold value, resulting in iterative comparisons;
    determining a minimum set of variables that excludes variables having an impact below a predetermined threshold on the output of the machine-learning model based on the iterative comparisons,
    wherein applying the machine-learning model to the first dataset comprising only the minimum set of variables generates an output equal to the first output,
    wherein each of the output and the first output comprise at least one of a prediction, a decision or a classification;
    applying the machine-learning model to new data to generate an output for the new data,
    wherein the new data comprises medical data for a patient that includes the minimum set of variables and the output for the new data predicts whether the patient has a medical condition; and
    periodically determining a new minimum set of variables based on repeated iterative comparisons with a subsequent randomized selection of variables.

14. The non-transitory computer-readable storage medium of claim 13, wherein the output for the new data comprises a prediction, decision, or classification associated with the new data.

15. The non-transitory computer-readable storage medium of claim 13, wherein the subset of variables is determined based at least in part on the difference of the first and second outputs.

16. The non-transitory computer-readable storage medium of claim 15, wherein the steps include :determining whether the difference is less than the predetermined threshold, wherein a variable is determined to have impact below the predetermined threshold based on a determination that the difference is less than the predetermined threshold.

17. The non-transitory computer-readable storage medium of claim 13, wherein the machine-learning model includes weighting factors associated with the randomized selection of variables, the steps further including:
    receiving training data determined to be usable for training the machine-learning model;
    training the machine-learning model with the processing system using the training data to determine values for the weighting factors; and
    configuring the machine-learning model with the determined values of the weighting factors.

18. The computer-implemented method of claim 1, wherein the iteratively removing is repeated either (i) a number of times equal to a number of the randomized selection of variables or (ii) a number of times equal to each possible combination of variables within the randomized selection of variables.

19. The computer-implemented method of claim 1, wherein the comparing of the first and second outputs determines whether the first output equals the second output.

20. The computer-implemented method of claim 1, wherein the first dataset is a randomized subset of data randomly selected from a larger dataset.

* * * * *